United States Patent
Pace et al.

[19]

[11] Patent Number: 6,160,490
[45] Date of Patent: Dec. 12, 2000

[54] APPARATUS FOR IMPROVING THE BATTERY LIFE OF A SELECTIVE CALL RECEIVER

[75] Inventors: Gary Lee Pace; Edgar Herbert Callaway, Jr., both of Boca Raton, Fla.; George Woodrow Smoot, Gilbert, Ariz.

[73] Assignee: Motorola, Schaumburg, Ill.

[21] Appl. No.: 09/017,564

[22] Filed: Feb. 2, 1998

[51] Int. Cl.[7] .................................................. G05F 1/575
[52] U.S. Cl. ........................ 340/825.44; 340/311.1; 455/343; 323/225; 323/269; 323/275
[58] Field of Search ...................... 340/825.44, 311.1; 455/343; 323/225, 269, 275

[56] References Cited

U.S. PATENT DOCUMENTS

| | | | |
|---|---|---|---|
| 4,631,737 | 12/1986 | Davis et al. | 455/343 |
| 4,893,094 | 1/1990 | Herold et al. | |
| 4,961,073 | 10/1990 | Drapac et al. | |
| 5,032,825 | 7/1991 | Kuznicki | |
| 5,144,296 | 9/1992 | Deluca et al. | |
| 5,251,325 | 10/1993 | Davis et al. | |
| 5,252,963 | 10/1993 | Snowden et al. | |
| 5,381,133 | 1/1995 | Erhart et al. | |
| 5,414,419 | 5/1995 | Schwendeman et al. | |
| 5,717,319 | 2/1998 | Jokinen | 323/269 |

*Primary Examiner*—Michael Horabik
*Assistant Examiner*—Yves Dalencourt
*Attorney, Agent, or Firm*—James A. Lamb

[57] ABSTRACT

A selective call receiver (100) operating from a battery (102), includes a battery monitor (114), a radio receiver (108), a regulator (104), a capacitor (105) coupled to the regulator and the radio receiver, and a processor (116) for controlling the foregoing elements. The processor is adapted to determine from the battery monitor an energy level of the battery, configure the regulator to supply a first limited current to the radio receiver and the capacitor for a first predetermined time when the energy level is above a predetermined threshold, or configure the regulator to supply a second limited current to the radio receiver and the capacitor for a second predetermined time when the energy level is at or below the predetermined threshold. After configuring the regulator, the processor is then adapted to enable the regulator to charge the capacitor and to power the radio receiver.

20 Claims, 7 Drawing Sheets

100

APPARATUS FOR IMPROVING THE BATTERY LIFE OF A SELECTIVE CALL RECEIVER

FIELD OF THE INVENTION

This invention relates in general to selective call receivers, and particularly, to an apparatus for improving the battery life of a selective call receiver.

BACKGROUND OF THE INVENTION

Portable battery operated radio communication units are used extensively in the radio communication industry. Common battery operated units include pagers and cellular phones. A feature generally considered an important aspect to consumers in selecting these products is the battery life performance of the portable radio unit.

Presently, portable radio units use conventional circuits and software techniques to determine when the battery of a portable unit has expired. Generally, when an Alkaline battery discharges, its internal resistance (Rs) rises. This resistance has an adverse effect on the battery life performance of a portable unit. This is especially apparent in portable units, such as pagers, which use low voltage batteries such as, for example, a 1.5 V AA cell. To increase battery life, the radio receiver of a portable unit is not operated continuously, but is instead strobed on and off. While operation in this manner extends battery life, each time the receiver is turned on, a large current pulse, or "inrush current," is drawn from the battery to, for example, charge filter capacitors that have discharged during the time the receiver is off.

Typically, to power the receiver a 1V regulator is used. Under ideal conditions, the receiver should be able to operate until the battery nearly reaches 1V. However, because of a buildup in the internal resistance of the battery, the inrush current experienced when the receiver is initially turned on, can cause the battery terminal voltage to drop below the minimum operating voltage of the radio receiver, thereby preventing the pager from operating properly and degrading battery life.

To avoid such a failure, present battery management techniques used in low power consumer products activate, for example, a visual signal on a display of the portable unit warning a user that the battery has expired and must be replaced. Generally, this warning signal is asserted when the battery terminal voltage has reached a predetermined voltage (e.g., 1.1 V±50 mV). This warning signal may be triggered even though under a lightly loaded situation (i.e., no inrush current from enabling the receiver) the battery terminal voltage is substantially higher, e.g., 1.2 V. Consequently, present battery management techniques result in a premature replacement of batteries.

Accordingly, what is needed is a battery management scheme that overcomes the foregoing disadvantages described in the prior art.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
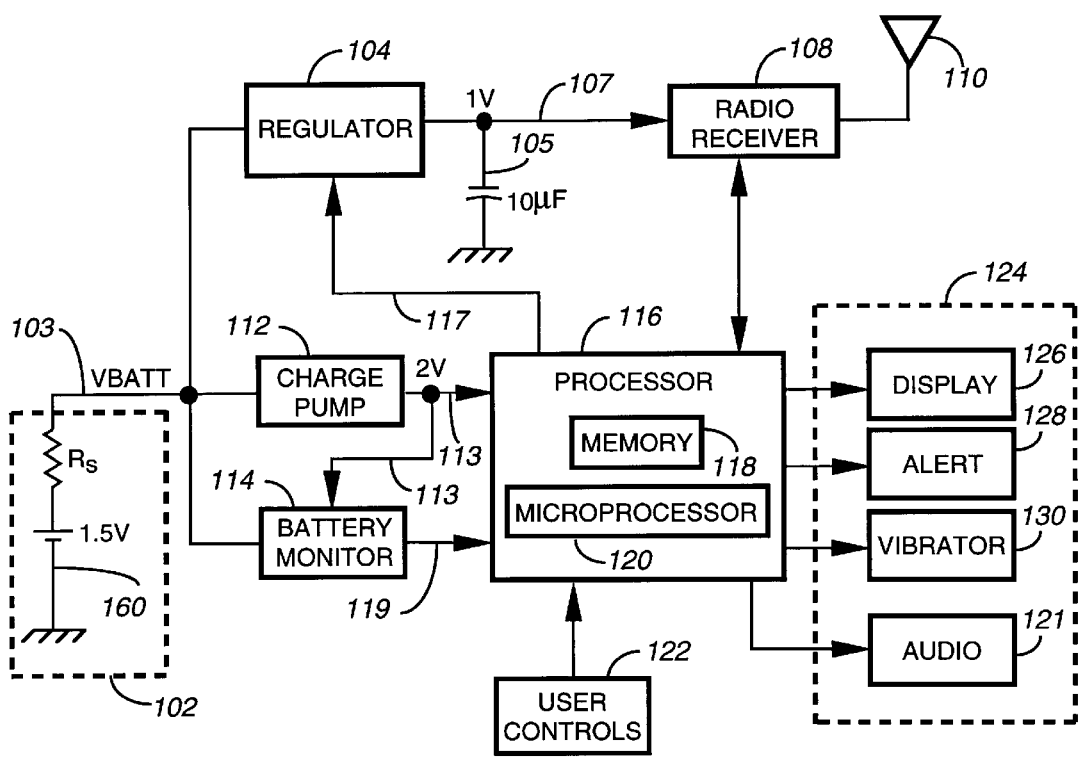
FIG. 1 shows an electrical block diagram of a selective call receiver according to the present invention.

FIG. 1 shows an electrical block diagram of a SCR 100 (selective call receiver) according to the present invention. The SCR 100 comprises an antenna 110 for intercepting RF signals from, for example, a conventional radio communication system (not shown). The antenna 110 is coupled to a radio receiver 108 employing conventional demodulation techniques for receiving communication signals transmitted by the radio communication system. Radio signals received by the radio receiver 108 produce demodulated information, which is coupled to a processor 116 for processing received messages. A regulator 104 is coupled to the radio receiver 108 to control the supply of power thereto. To stabilize the operation of the regulator 104, and to reduce low-frequency noise present on the supply voltage, a large capacitor 105 (shown by way of example as 10 uF) is coupled between the regulator 104 and the radio receiver 108. The supply of power originates from a conventional battery 102 (shown by way of example as a "AA" 1.5V battery).

To perform the necessary functions of the SCR 100, the processor 116 includes a microprocessor 120 coupled to a memory 118 that includes, for example, a random access memory (RAM), a read-only memory (ROM), and an electrically erasable programmable read-only memory (EEPROM). The processor 116 is, for example, similar to the M68HC11 micro-controller manufactured by Motorola, Inc. It will be appreciated that other similar processors can be utilized for the processor 116, and that additional processors of the same or alternative type can be added as required to handle the processing requirements of the processor 116.

The processor 116 is programmed, for example, by way of the ROM to process incoming messages transmitted by the radio communication system. The processor 116 decodes an address in the demodulated data of the received message, compares the decoded address with one or more addresses stored in the EEPROM, and when a match is detected, proceeds to process the remaining portion of the message. Once the processor 116 has received the message, the radio receiver 108 is powered down by way of signals transmitted by the processor 116 on an output mode control terminal 117 coupled to the regulator 104. To maximize the battery life of the selective call receiver 100, the radio receiver 108 is strobed "on" and "off" periodically. It should be noted that capacitor 105 will fully or partially discharge during the radio receiver 108 "off" interval due to capacitor leakage and/or residual off current drain occurring at the radio receiver 108 and the regulator 104. Shortly after receiving the message from the radio receiver 108, the processor 116 stores the message in the RAM, and a call alerting signal is generated to alert a user that a message has been received. The call alerting signal is directed to a conventional audible alerting device 128 or a tactile alerting device, such as a vibrator motor 130, for generating an audible or tactile call alerting signal.

The message can be accessed by the user through user controls 122, which provide functions such as lock, unlock, delete, read, etc. More specifically, by the use of appropriate functions provided by the user controls 122, the message is recovered from the RAM, and conveyed to the user by way of a display, e.g., a conventional display 126 with, for example, an EL-Panel (electroluminescent panel) for lighting the display 126. It will be appreciated that other circuits may be used backlighting of the display 126. The display 126 can also be accompanied by an audio circuit 121 for conveying voice messages and/or any other audio application.

The EL-Panel of the display 126, the alerting device 128, the vibrator motor 130 and the audio circuit 121 in combination comprise a high-current load circuit 124. These circuits each consume high amounts of current. This property will be important in the battery management discussions that follow. Prior to these discussions, however, a description on the battery management circuit elements of the SCR 100 follows.

The elements of the battery management circuit include the regulator 104 mentioned above, a charge pump 112 and a conventional battery monitor 114. Each of these circuits is coupled to a source terminal 103 of the battery 102. The charge pump 112 is a conventional power management circuit that augments the voltage of the source terminal 103 of the battery 102 to a desired operating voltage 113 (shown by way of example as 2V). The operating voltage 113 is supplied both to the processor 116 and the battery monitor 114. The battery monitor 114 includes, for example, a conventional comparator coupled to the battery 102 and an internal reference at, e.g., 1.2 V. The battery monitor 114 monitors the terminal voltage of the battery 102 and informs the processor 116 when the battery 102 is at or below a predetermined threshold (e.g., at or below 1.2 V). This information is relayed to the processor 116 by way of terminal 119 coupled to the processor 116. It will be appreciated that other methods suitable to the present invention for monitoring the energy level of the battery 102 may be employed such as, for example, applying one or more predetermined loads to the battery 102 and measuring the current drawn therefrom. This method could be used to measure, for example, the internal resistance (Rs) of the battery 102.

Figure 5:
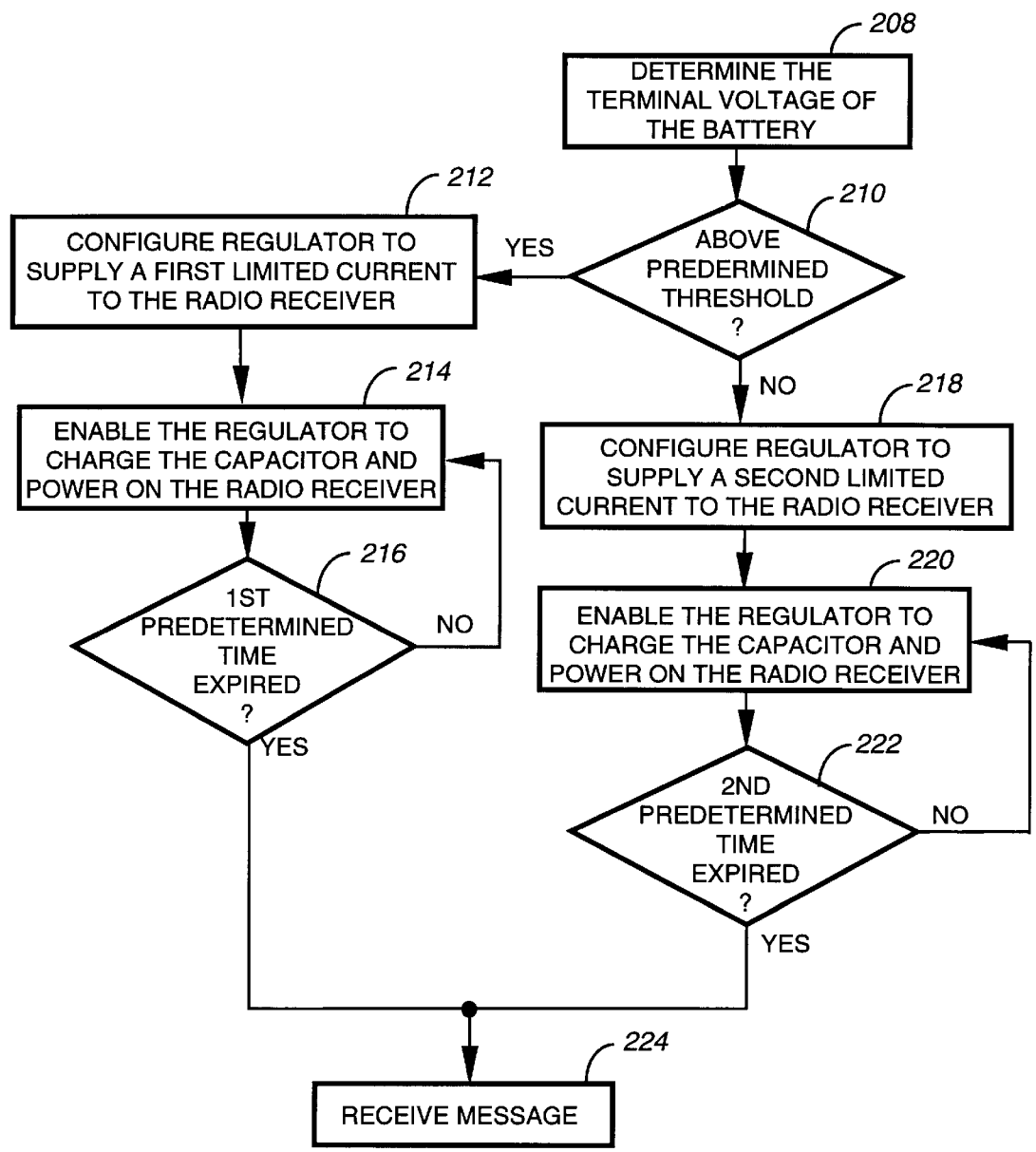
FIGS. 5 through 7 show flow charts representing first, second and third embodiments that summarize the battery management operations of the selective call receiver according to the present invention.
Figure 6:
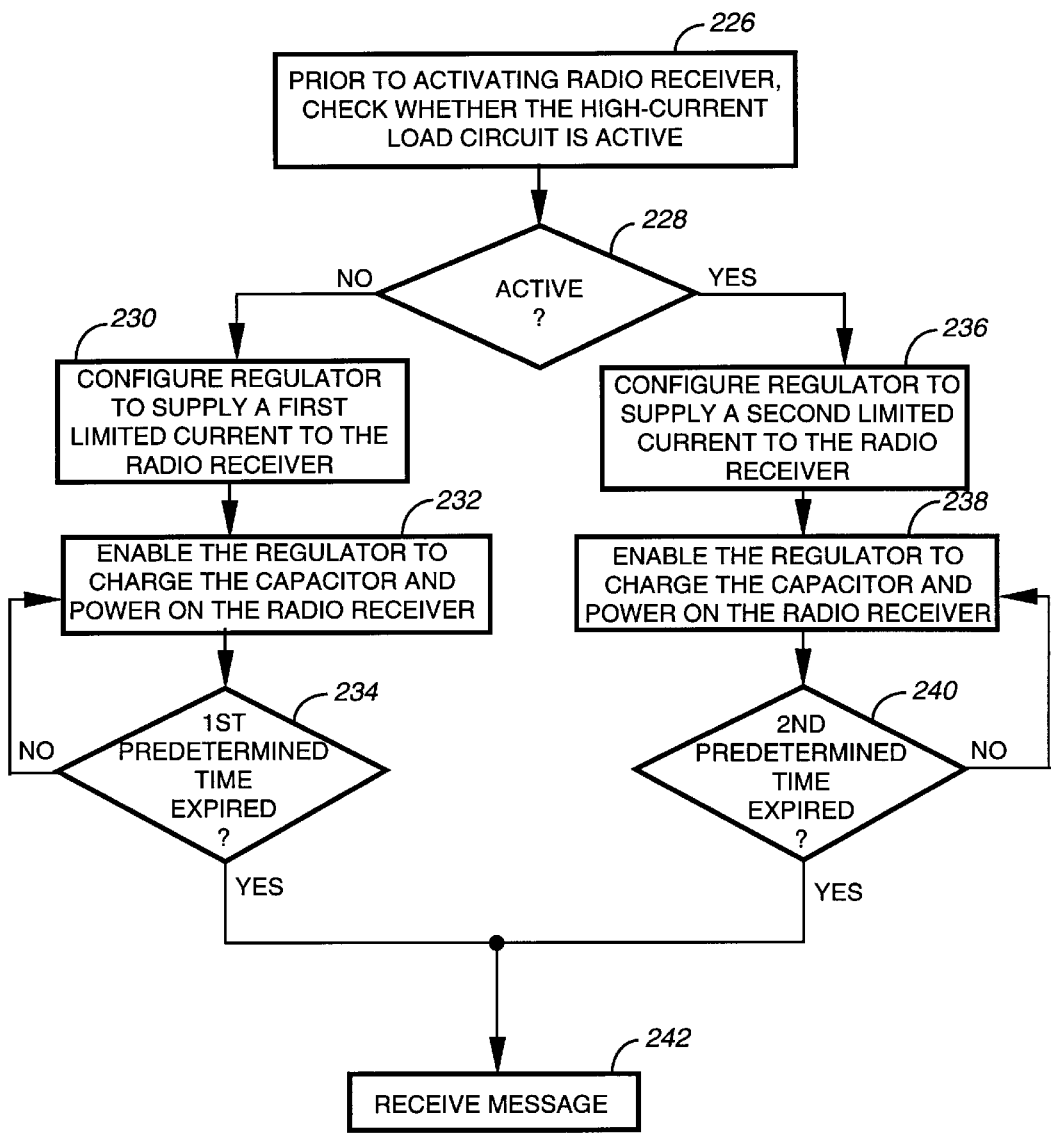
Figure 7:
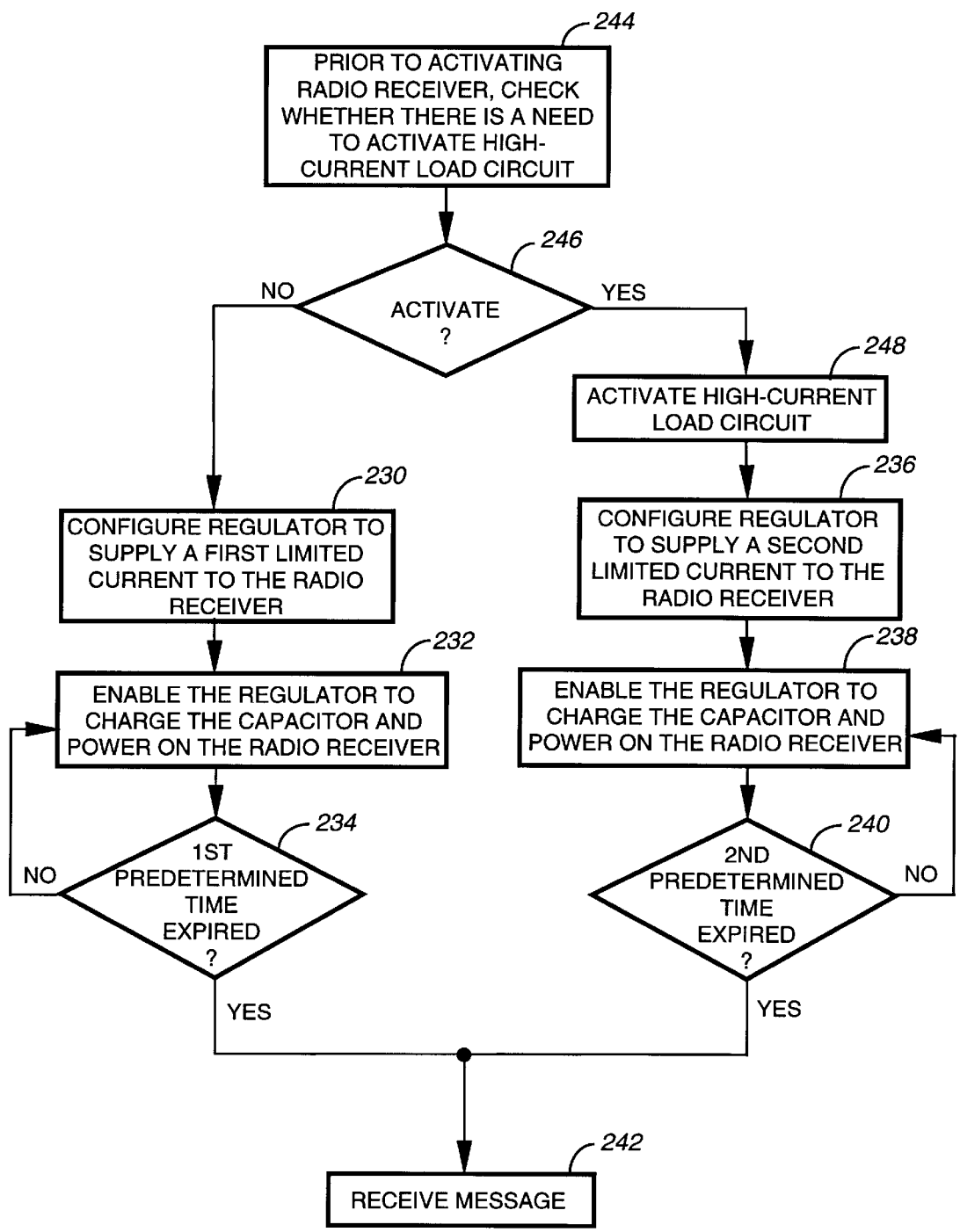

FIGS. 5 through 7 show flow charts depicting first, second and third embodiments that summarize the battery management operations of the SCR 100 according to the present invention. These functions are preferably software instructions that are programmed into the memory 118 of the processor 116. It will be appreciated that, alternatively, other methods may be employed for implementing the present invention such as, for example, using an application specific integrated circuit (ASIC) that includes hardware timers, and algorithmic state machines for performing the functions described below.

In the first embodiment, shown in FIG. 5, the processor 116, in step 208, is adapted to determine from the battery monitor 114 the terminal voltage 103 of the battery 102. In step 210, the processor 116 determines whether the terminal voltage 103 of the battery 102 measured by the battery monitor 114 is above a predetermined threshold. In the present example, the predetermined threshold is preferably determined according to, for example, the desired operating voltages of the charge pump 112 and the regulator 104, the load current presented by the processor 116 and the radio receiver 108 during operation, and the change in the internal series resistance (Rs) of the battery 102 (shown in FIG. 1) as energy from the battery 102 is discharged. Each of these effects on the life of a battery may be measured experimentally, and by way of statistics, an appropriate predetermined threshold can be derived that achieves two goals: successful operation of all circuits of the SCR 100 during normal operation, while contemporaneously utilizing the battery 102 in a manner that optimizes the battery life of the SCR 100. It will be appreciated, however, that more sophisticated methods for determining a predetermined threshold may be employed by the present invention.

In most applications, the charge pump 112 shown in FIG. 1 can operate below a 1V battery terminal voltage 103. This, however, is not the case for the regulator 104, which must generate a steady and relatively noise-free 1V signal 107 to the radio receiver 108. Some 1V regulators, such as the one shown in FIG. 1, can generate a noise free 1V signal as long as the battery terminal voltage 103 is at least 50 millivolts (mV) above the desired operating voltage of the regulator 104. Hence, the regulator 104 is operational as long as the terminal voltage 103 of the battery 102 is at or above 1.05 V.

However, as mentioned earlier, once the terminal voltage of a battery lowers, its internal resistance (Rs) rises. Recalling that the SCR 100 strobes the radio receiver 108 "on" and "off" periodically, when the radio receiver 108 is powered on, it is possible, for example, that a large inrush current (e.g., 80 mA) caused by charging of the discharged capacitor 105 is presented to the battery 102. As a result of the inrush current, and a high internal resistance (Rs) of the battery 102, the terminal voltage 103 can drop below the minimum supply voltage tolerated by the regulator 104 (e.g., 1.05 V), thereby causing output 107 of the regulator 104 to fall below 1V. Prior art systems avoid this condition by preventing operation of the SCR 100, and by alerting its user to replace the battery 102 with a fresh battery. This method, however, results in a premature notification to the user of the SCR 100 that the battery 102 must be replaced, thereby reducing the effective battery life of the SCR 100.

To avoid this, and to take advantage of the untapped energy remaining in the battery 102, the processor 116 initializes the regulator 104 to supply varying limited currents to the radio receiver 108 at varying warm-up intervals. That is, when the processor 116 in step 210 detects that the terminal voltage 103 of the battery 102 is above the predetermined threshold (e.g., 1.2 V), which is indicative of a fresh battery (e.g., 1.4 V), then the regulator 104 in step 212 is configured to supply a first limited current (e.g., 15 mA) to the radio receiver 108 and the capacitor 105. The regulator 104 is then enabled in step 214 to supply the first limited current to the radio receiver 108 and the capacitor 105 for a first predetermined time (e.g., a warm-up time of 4 ms) in step 216. After the radio receiver 108 has been warmed up, it is ready to receive messages in step 224. A fast warm-up of the radio receiver 108 is preferred because it maximizes the "off" time of the radio receiver 108, thereby significantly extending the battery life of the SCR 100. However, when the internal resistance (Rs) of the battery 102 is high, indicative of a substantially discharged battery, an alternative approach must be applied to further extend the battery life of the SCR 100.

A high internal resistance (Rs) is detected by the processor 116 in step 210 by monitoring when the terminal voltage 103 of the battery 102 reaches a voltage at or below the predetermined threshold (e.g., 1.2 V). Once the terminal voltage 103 is detected at or below the predetermined threshold, the processor 116 proceeds to step 218 where it configures the regulator 104 to supply a second limited current (e.g., 10 mA) to the radio receiver 108 and the capacitor 105. The regulator 104 is then enabled in step 220 to supply the second limited current to the radio receiver 108 and the capacitor 105 for a second predetermined time (e.g., a warm-up time of 5 ms) in step 222 until it is ready to receive messages in step 224.

Thus, by extending the warm-up time of the radio receiver 108 and by limiting the inrush current to a level that prevents the terminal voltage 103 of the battery 102 from falling below the minimum operating voltage of the regulator 104 (e.g., 1.05 V), the utilization of the battery 102 can be increased, thereby extending the battery life of the SCR 100. It will be appreciated that the functional steps described above may be implemented by way of a hybrid of software and hardware methods. For example, the first and second predetermined times may be implemented either in software, or by the use of conventional hardware timers. Similarly, these steps may be implemented by plurality of processors coordinated with each other to perform a similar or identical function as described by the flow chart of FIG. 5.

FIG. 6 shows a second embodiment summarizing the battery management operation of the SCR 100 according to the present invention. In this embodiment, the processor 116 does not use the battery monitor 114 as described in the flow chart of FIG. 5. Rather, the processor 116 prior to activating the radio receiver 108, checks in step 226 whether any of the elements of the high-current load circuit 124 are active. If the high-current load circuit 124 is found to be inactive, in step 228, then the processor 116 proceeds to step 230 where it configures the regulator 104 to supply the first limited current (e.g., 15 mA) to the radio receiver 108 and the capacitor 105. The processor 116 then enables the regulator 104 in step 232 to supply the first limited current to the radio receiver 108 and the capacitor 105 until the first predetermined time (e.g., 4 ms) has expired in step 234. Once the radio receiver 108 is operational (i.e., warmed-up), the processor 116 proceeds to receive a message in step 242.

Alternatively, if the high-current load circuit 124 has an active element (e.g., audible alert 128), then the processor 116 proceeds to step 236 where it configures the regulator 104 to supply the second limited current (e.g., 10 mA) to the radio receiver 108 and the capacitor 105. The radio receiver 108 is then enabled in step 238 to supply the second limited current to the radio receiver 108 and the capacitor 105 until the second predetermined time (e.g., 5 ms) has expired in step 240. Once the second predetermined time has expired, the processor 116 proceeds to receive a message in step 242. This embodiment differs from the previous embodiment in that it prevents high currents from being drained from the battery 102 independent of whether the battery 102 is fresh or not.

The third embodiment (shown in FIG. 7) is substantially similar to the second embodiment, with the exception that prior to enabling the radio receiver 108, the processor 116 in step 244 checks whether there is a need to activate any element of the high-current load circuit 124. If no element of the high-current load circuit 124 needs to be activated, the processor 116 proceeds from step 246 to steps 230–234 and 242 in the same manner as described for the flowchart of FIG. 6. If, however, one or more elements of the high-current load circuit 124 need to be activated, then the processor 116 proceeds to step 248 where the one or more elements of the high-current load circuit 124 are activated. Subsequently, the processor 116 proceeds to steps 236–240 and 242 in the same manner as described for the flowchart of FIG. 6. It will be appreciated that any of the foregoing embodiments shown in FIGS. 5–7 may be combined to further enhance the battery life performance of the SCR 100.

It will be appreciated that in any of the foregoing embodiments described in FIGS. 5–7, an additional battery monitor can be used for detecting a low-battery condition. This additional battery monitor would be set to a predetermined threshold such as, for example, 1.1 V±50 mV that is lower than the predetermined threshold of battery monitor 114. Thus, the battery monitor 114 detects when the terminal voltage 103 of the battery 102 reaches the predetermined threshold (e.g., 1.2 V) for switching the regulator 104 to the second limited current (e.g., 10 mA) and the corresponding slow warm-up time (e.g., 4 ms). In contrast, the additional battery monitor detects when the terminal voltage 103 of the battery 102 under a no load condition (i.e., no inrush current from the capacitor 105 and radio receiver 108) reaches the lower predetermined threshold (1.1 V±50 mV) at which time further use of the battery 102 is impracticable. When the battery 102 reaches this lower predetermined threshold, the processor 116 is programmed to alert the user of the SCR 100 that the battery 102 needs to be replaced with a fresh battery.

Figure 2:
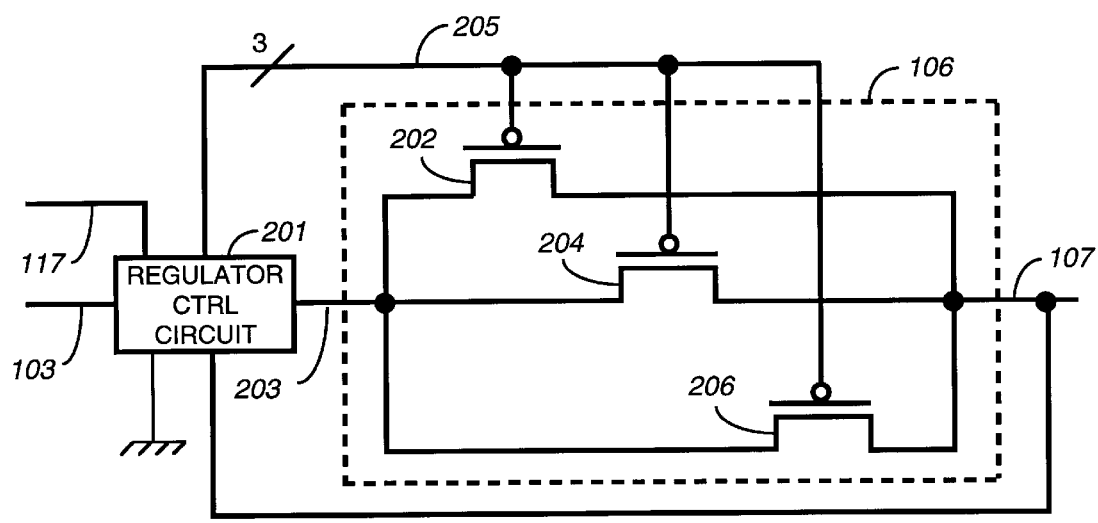
FIGS. 2 and 3 show an electrical block diagram of first and second embodiments of a regulator according to the present invention.
Figure 3:
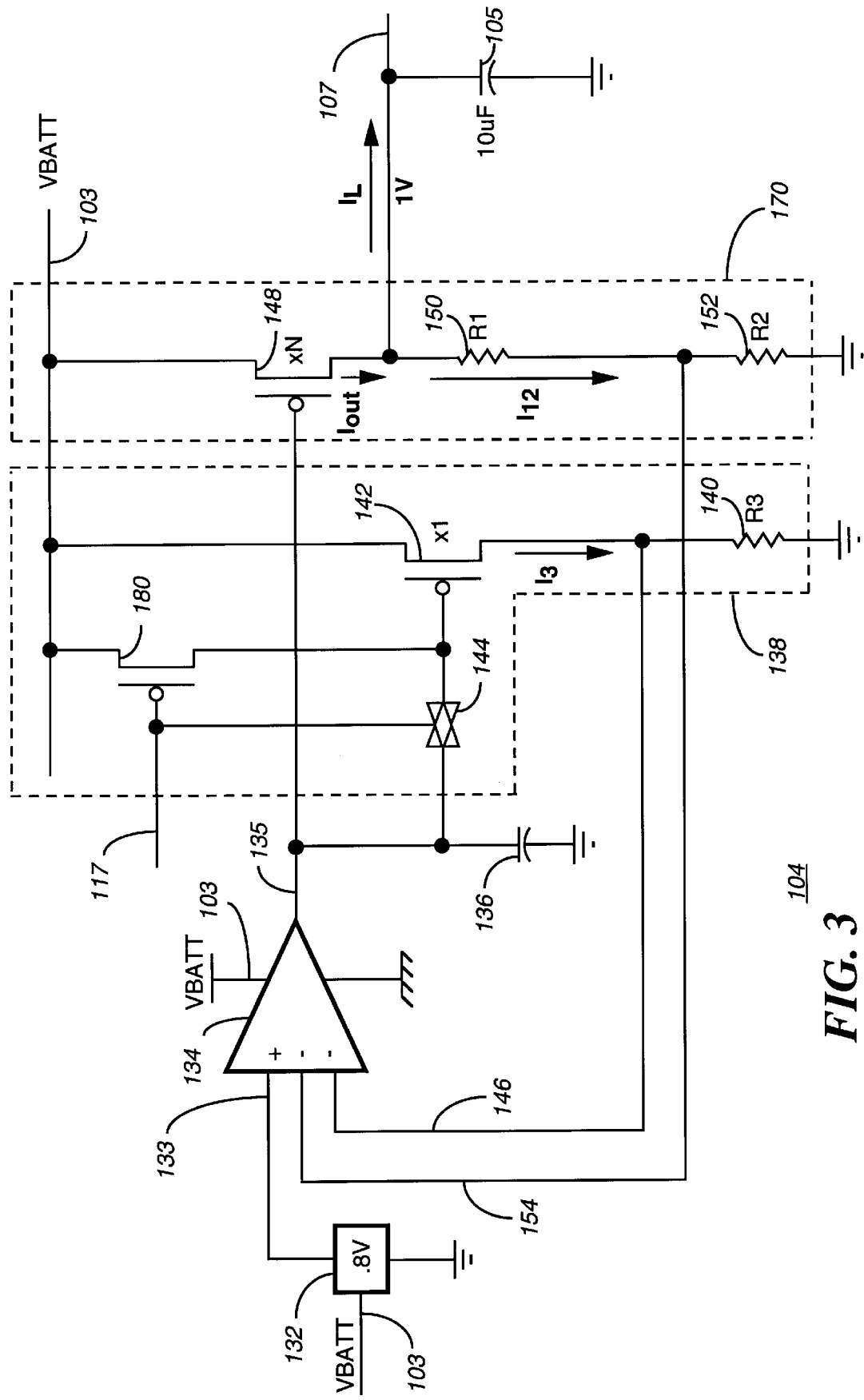

Turning now to the design of the regulator 104 shown in FIG. 1, FIGS. 2 and 3 show an electrical block diagram of first and second embodiments of the regulator 104 according to the present invention. In a first embodiment, the regulator 104 (e.g., a 1V regulator) comprises a conventional regulator control circuit 201 and a peak-current control circuit 106. The regulator control circuit 201 is coupled to ground and to the battery terminal 103 for sourcing current to the peak-current control circuit 106 by way of terminal 203, which in turn sources current to the radio receiver 108 at the output terminal 107 when one or more elements of the peak-current control circuit 106 are enabled. To maintain a regulated voltage of, for example, 1 V at the output terminal 107, the output terminal 107 is fed back to the regulator control circuit 201. To limit the amount of current that can be supplied to the radio receiver 108, the peak-current control circuit 106 includes, by way of example, three current control devices 202–206 (shown as P-MOS (metal oxide semiconductor transistors)) in series with the regulator control circuit 201 and the radio receiver 108.

Each transistor is designed, for example, with a different channel width, thereby providing a low-current transistor 202, intermediate-current transistor 204 and high-current transistor 206 for supplying current to the radio receiver 108 at varying programmable levels. The transistors 202–206 are enabled singly or in combination by way of signals transmitted on the control output 205 of the regulator control circuit 201, which in turn are controlled by the processor 116 by way of the output mode control terminal 117. The transistors 202–206 operate in the active region under the control of the regulator control circuit 201 in a manner that maintains a steady-state voltage of approximately 1 V at the output 107 of the regulator 104. The output mode control terminal 117 in this example comprises a bus including three control signals, each signal corresponding to a selected one of the transistors 202–206. It will be appreciated that the output mode control terminal 117 may consist of any number of signals depending on the number of elements that need to be controlled in a particular application. Alternatively, it will be appreciated that the output mode control terminal 117 may consist of a single wire where control information is transmitted to the regulator control circuit 201 serially utilizing conventional communication techniques.

The processor 116 selects a combination of transistors 202–206 depending on a supply current to be furnished to the radio receiver 108. For example, in the case where it is desirable to supply a second limited current to the radio receiver 108 (e.g., 10 mA—slow warm-up current), the low-current switch 202 (i.e., the one with the narrowest channel) is enabled, while the remaining transistors 204–206 are disabled. Under this scenario, the regulator 104 supplies the second limited current to the radio receiver 108 independent of the load presented by the capacitor 105 and the capacitive load of the radio receiver 108.

In the case where an intermediate amount of current is desirable (e.g., the first limited current at, for example, 15 mA), the low and intermediate current transistors 202–204 may be enabled in combination. It should be noted that by combining these transistors two objectives are accomplished. First, a higher current supply is provided to the radio receiver 108, and second the combined channel resistance of the transistors 202–204 is lowered, thereby minimizing energy loss due to the internal resistance of each transistor. Finally, in the case where a maximum supply current (e.g., 20 mA) is desirable, all three transistors 202–206 may be enabled at the same time. This scenario is preferred when the series resistance of the battery 102 is substantially low (i.e., a fresh battery).

In sum, the processor 116 has the capability, for example, of enabling a first combination of the plurality of current control devices (e.g., the low and intermediate current transistors 202–204) for supplying a first limited current to the radio receiver 108, and further may, for example, enable a second combination of the plurality of current control devices (e.g., the low-current transistor 202) for supplying a second limited current to the radio receiver 108.

FIG. 3 shows an alternative and more sophisticated embodiment of the regulator 104 shown in FIG. 2. In this embodiment, the regulator 104 comprises an operational amplifier 134, a voltage reference circuit 132, a loop stability element 136, a high-power current switch 170, and a peak current control circuit 138. The operational amplifier 134 has a positive input terminal 133, first and second negative input terminals 146, 154, an output terminal 135, and positive and negative supply terminals coupled to the positive and negative supply terminals 103, 160 of the battery 102. The voltage reference circuit 132 has an output terminal coupled to the positive input terminal 133 of the operational amplifier 134, and has positive and negative supply terminals also coupled to the positive and negative supply terminals 103, 160 of the battery 102. The loop stability element 136 is coupled to the output terminal 135 of the operational amplifier 134 and ground, and serves to eliminate instability in the operation of the high-power current switch 170, and the peak current control circuit 138.

The high-power current switch 170 comprises an input terminal coupled to the output terminal 135 of the operational amplifier 134, positive and negative supply terminals coupled to positive and negative supply terminals 103, 160 of the battery 102, an output terminal 107 coupled to the radio receiver 108, and a feedback terminal coupled to the first negative input terminal 154 of the operational amplifier 134. The peak-current control circuit 138 has an input terminal coupled to the output terminal 135 of the operational amplifier 134, a mode control terminal coupled to the output mode control terminal 117 of the processor 116. The mode control terminal is used for enabling the peak-current control circuit 138. The peak-current control circuit 138 further has a feedback terminal coupled to the second negative input terminal 146 of the operational amplifier 134, and positive and negative supply terminals coupled to positive and negative supply terminals 103, 160 of the battery 102.

Preferably, the high-power current switch 170 comprises a first P-MOS transistor 148 having a first predetermined current capacity (shown symbolically by the xN symbol), a gate terminal coupled to the output terminal 135 of the operational amplifier 134, an input terminal coupled to the positive supply terminal 103 of the battery 102, and an output terminal 107. The high-power current switch 170 further includes a first resistor 150 (shown by way of example as R1) having first and second terminals, wherein the first terminal is coupled to the output terminal 107 of the first P-MOS transistor 148. The high-power current switch 170 also includes a second resistor 152 (shown by way of example as R2) having first and second terminals, wherein the first terminal is coupled to the second terminal of the first resistor 150 and is further coupled to the feedback terminal 154 of the high-power current switch 170. The second terminal of the second resistor 152 is coupled to ground.

The peak-current control circuit 138 comprises a switch 144 (shown by way of example as a transmission gate) having an input and output terminal, wherein the input terminal is coupled to the output terminal 135 of the operational amplifier 134. The switch 144 further has a control terminal coupled to the mode control terminal 117. The peak-current control circuit 138 further includes a second P-MOS transistor 142 having a second predetermined current capacity equal to substantially a fraction of the first predetermined current capacity (shown by way of example here as x1). The second P-MOS transistor 142 has a gate terminal coupled to the output terminal of the switch 144, an input terminal coupled to the positive supply terminal 103 of the battery 102, and an output terminal coupled to the feedback terminal 146. Further included is a resistor 140 (shown by way of example as R3) having first and second terminals, the first terminal coupled to the output terminal of the second P-MOS transistor 142, and the second terminal coupled to ground. Lastly, the peak-current control circuit 138 includes a third P-MOS transistor 180 having a gate terminal coupled to the mode control terminal 117, an input terminal coupled to the positive supply terminal 103, and an output terminal coupled to the gate terminal of the second P-MOS transistor 142.

This embodiment of the regulator 104 operates as follows. When activated, the peak-current control circuit 138 is used for limiting the peak inrush current drawn by the capacitor 105 from the high-power current switch 170. When the peak-current control circuit 138 is inactive, the high-power current switch 170 is only limited by the channel capacity of the P-MOS transistor 148 and the capacity of the battery 102 to source current to the capacitor 105 and the radio receiver 108. The peak-current control circuit 138 is activated by the mode control terminal 117 set to a logic high state. This in turn enables the switch 144 which directly couples the output of the operational amplifier 134 to gate terminal 141 of the P-MOS transistor 142. To deactivate the peak-current control circuit 138, the mode control terminal 117 is set to a logic high state, which in turn activates P-MOS transistor 180, which in turn deactivates P-MOS transistor 142 by raising the voltage of its gate terminal 141 to a high logic state. This operation also deactivates the switch 144, thereby disconnecting the operational amplifier 134 from the P-MOS transistor 141.

Switching attention to the high-power current switch 170, the P-MOS transistor 148 is controlled by the output voltage of the operational amplifier 134. During the initial power on sequence of the regulator 104, the voltage reference circuit 132 applies 0.8V to the positive terminal 161 of the operational amplifier 134, and the negative input terminals 154, 146 are approximately at ground, thereby saturating the operational amplifier 134 to one rail of its power terminals— here, preferably the ground terminal. This in turn, fully saturates the P-MOS transistors 180, 148 to their on-state. This saturation continues until either of the negative input terminals of the operational amplifier 134 reaches 0.8V. Once the operational amplifier 134 is out of saturation, the high-power current switch 170 operates as a 1V regulator supplying a steady stream of current to the radio receiver 108. The capacitor 136, serves as a loop stability element so as to stabilize the high-power current switch 170 while the operational amplifier 134 enters and exits saturation based on a fluctuating feedback voltage sensed across R2.

For the high-power current switch 170, the resistors R1 and R2 are selected so that their ratio generates a 0.8V drop across R2 at the feedback terminal 165, which is coupled to the first negative input terminal 154 of the operational amplifier 134. The resistor 140, designated as R3, serves as the primary element for controlling the inrush current at the output terminal 151 of the high-power current switch 170 during the power-on sequence of the regulator. R3 may be determined from the current I3 and the fact that the P-MOS switch 142 will be out of saturation when the second negative input 146 of the operational amplifier 134 is at 0.8V. Since the P-MOS switch 142 is approximately 1/Nth the size of the P-MOS switch 148, it follows that I3 may be approximated to Iout/N. From this it follows that R3=N (0.8V/Iout), and Iout=N(0.8V/R3). As expected, the larger R3 is, the lower the peak current of Iout.

The values for R1 and R2 can be determined as follows. The desired operational voltage at the output terminal 107 is 1V. When the first negative input terminal 154 reaches 0.8V, the operational amplifier 134 takes the P-MOS transistor 148 out of saturation. Based on these two known factors, the following equation is valid: 1V=I12(R1+R2). The current I12 which passes through R1 and R2 is equal to 0.8V/R2 since the feedback voltage of 0.8V is across R2. It follows then that a ratio for R1 and R2 may be solved from the previous equation. This ratio turns out to be R1=R2/4. Finally, the load current ($I_L$) at the output terminal 107 may be determined from the equation $I_L$=Iout−I12. The current I12 is constant, so the peak current is determined from Iout, which we saw before follows the equation Iout=N(0.8V/R3).

Turning to an example, lets say that the current at the output terminal 107 needs to be limited to a 15 mA peak current. Assuming N=20, I3=750 uA. This gives a value for R3 of 1066 Ohms. Next, R1 and R2 are selected large to minimize loss. Letting R1=1M Ohms, it follows that R2=250K Ohms, and that I12=3.2 uA. Hence, when the regulator 104 is first enabled, P-MOS transistor 142 will draw 750 uA, and P-MOS transistor 148 will draw no more than 15 mA. The radio receiver 108 in turn will be provided approximately 15 mA. As the surge current (IL) at the output terminal 107 decreases due to the charging of capacitor 105, the voltage at feedback terminal 146 will decrease from 0.8 volts and the peak current control circuit 138 will no longer control the high-power current switch 170. Rather, the high-power current switch 170 will be controlled by its own feedback signal 154. It should be noted that if the regulator 104 is powered on with the peak-current control circuit 138 disabled, then the high-power current switch 170 will source as much current as it is capable of sourcing based on its design, and, of course, on how much current the battery 102 itself can source.

Figure 4:
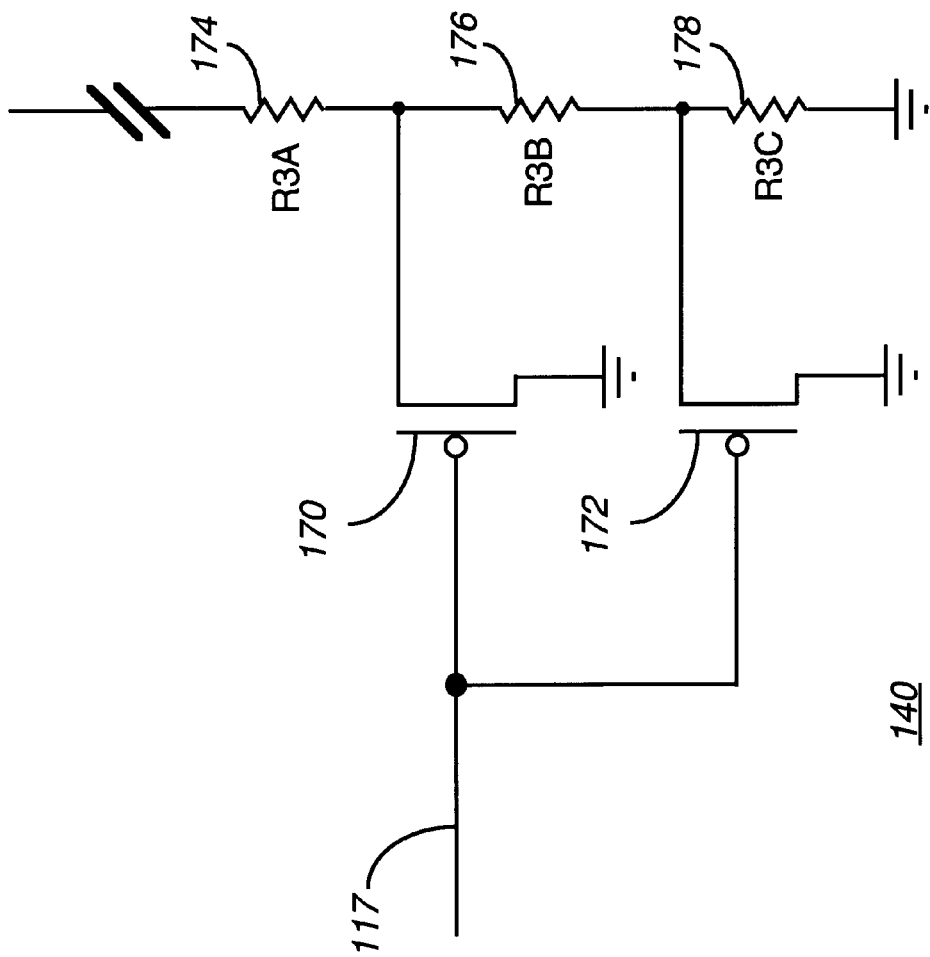
FIG. 4 shows an electrical block diagram of a variable resistor network according to the present invention.

It will also be appreciated that the above description of the peak-current control circuit 138 may be altered so as to provide variable peak current programming of the high-power current switch 170. This may be accomplished by replacing R3 with a variable resistor electronically controlled by the mode control terminal. FIG. 4 provides an example of an electronically controlled variable resistor. FIG. 4 shows a network of resistors in series, which can be controlled by way of software and a network of switches to augment or lower the resistance of R3, thereby providing variable peak current control of the high-power current switch 170. An example network of resistors (R3A–R3C 174–178) and switches 170–172 is shown in FIG. 4. Using the network configuration shown in FIG. 4, the original value of R3 shown in FIG. 3 (assuming R3=R3A) may be established by enabling switch 170, thereby effectively removing R3B–R3C. This configuration would produce the highest current limit at Iout (e.g., 20 mA). For a lower current limit at Iout (e.g., 15 mA), R3A and R3B can be enabled together by disabling switch 170 and enabling instead switch 172. For the lowest current limit at Iout (e.g., 10 mA), R3A–R3C can be enabled by disabling both switches 170–172. It will be appreciated that this network of resistors and switches can be expanded to as many resistive elements as might be suitable to a particular application. Control of switches 170–172 is preferably derived from bus signals carried by the output mode control terminal 117. It will be appreciated that, alternatively, a network of appropriately sized NMOS devices with an appropriate gate bias may be used to construct an electronically controlled variable resistor.

It will also be appreciated that the PMOS transistors described above for the high-power current switch 170 and the peak-current control circuit 138 may be replaced any other suitable switches such as, for example, bipolar transistors.

It should be apparent from the foregoing descriptions that the present invention provides a substantial advantage to prior art systems that do not perform the battery management scheme described above. Particularly, the present invention provides for an additional extension of battery life of an SCR 100 that present conventional circuits and software cannot provide.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A selective call receiver operating from a battery, comprising:

a battery monitor coupled to the battery;

a radio receiver;

a regulator coupled to the battery and the radio receiver;

a capacitor coupled to the regulator and the radio receiver; and a processor coupled to the battery monitor, the radio receiver and the regulator, the processor:

determine from the battery monitor an energy level of the battery, configures the regulator to supply a first limited current to the radio receiver and the capacitor for a first predetermined time when the energy level is above a predetermined threshold, configures the regulator to supply a second limited current to the radio receiver and the capacitor for a second predetermined time when the energy level is at or below the predetermined threshold, wherein the first and second limited currents, and the first and second predetermined times are not the same, and enables the regulator to charge the capacitor and to power the radio receiver.

2. The selective call receiver as recited in claim 1, wherein the energy level is determined by a terminal voltage of the battery.

3. The selective call receiver as recited in claim 1, wherein the energy level is determined by applying a predetermined load to the battery and measuring current drawn therefrom.

4. The selective call receiver as recited in claim 1, wherein the processor further comprises an output mode control terminal, and wherein the regulator comprises:
- an operational amplifier having a positive input terminal, first and second negative input terminals, an output terminal, and positive and negative supply terminals, wherein the positive and negative supply terminals are coupled to positive and negative supply terminals of the battery, respectively;
- a voltage reference circuit having an output terminal coupled to the positive input terminal of the operational amplifier, and positive and negative supply terminals, wherein the positive and negative supply terminals are coupled to positive and negative supply terminals of the battery, respectively;
- a loop stability element coupled to the output terminal of the operational amplifier;
- a high-power current switch including:
  - an input terminal coupled to the output terminal of the operational amplifier,
  - positive and negative supply terminals coupled to positive and negative supply terminals of the battery, respectively,
  - an output terminal coupled to the radio receiver, and
  - a feedback terminal coupled to the first negative input terminal of the operational amplifier; and
- a peak-current control circuit including:
  - an input terminal coupled to the output terminal of the operational amplifier,
  - a mode control terminal coupled to the output mode control terminal of the processor, wherein the mode control terminal is used for enabling the peak-current control circuit,
  - a feedback terminal coupled to the second negative input terminal of the operational amplifier, and
  - positive and negative supply terminals coupled to positive and negative supply terminals of the battery, respectively.

5. The selective call receiver as recited in claim 4, wherein the high-power current switch comprises:
- a first P-MOS transistor having:
  - a first predetermined current capacity,
  - a gate terminal coupled to the input terminal of the high-power current switch,
  - an input terminal coupled to the positive supply terminal of the high-power current switch, and
  - an output terminal coupled to the output terminal of the high-power current switch;
- a first resistor having first and second terminals, wherein the first terminal is coupled to the output terminal of the first P-MOS transistor; and
- a second resistor having first and second terminals, wherein the first terminal of the second resistor is coupled to the second terminal of the first resistor and is further coupled to the feedback terminal of the high-power current switch, and the second terminal of the second resistor is coupled to a ground potential.

6. The selective call receiver as recited in claim 5, wherein the peak-current control circuit comprises:
- a switch having:
  - an input and output terminal, wherein the input terminal is coupled to the input terminal of the peak-current control circuit, and
  - a control terminal coupled to the mode control terminal of the peak-current control circuit;
- a second P-MOS transistor having:
  - a second predetermined current capacity equal to a fraction of the first predetermined current capacity,
  - a gate terminal coupled to the output terminal of the switch;
  - an input terminal coupled to the positive supply terminal of the peak-current control circuit, and
  - an output terminal coupled to the feedback terminal of the peak-current control circuit;
- a third resistor having first and second terminals, the first terminal coupled to the output terminal of the second P-MOS transistor, and the second terminal coupled to a ground potential; and
- a third P-MOS transistor having:
  - a gate terminal coupled to the mode control terminal of the peak-current control circuit,
  - an input terminal coupled to the positive supply terminal of the peak-current control circuit, and
  - an output terminal coupled to the gate terminal of the second P-MOS transistor.

7. The selective call receiver as recited in claim 6, wherein the third resistor comprises a variable resistor controlled by the mode control terminal.

8. The selective call receiver as recited in claim 7, wherein the variable resistor comprises:
- a plurality of resistors coupled to each other in series; and
- a corresponding plurality of switches having first and second terminals, and a control terminal,
  - wherein the first and second terminals of each of the corresponding plurality of switches is coupled to a node of a corresponding one of the plurality of resistors and to ground, respectively, and
  - wherein the control terminal of each of the corresponding plurality of switches is coupled to the mode control terminal.

9. The selective call receiver as recited in claim 1, wherein the processor further comprises an output mode control terminal, and wherein the regulator comprises:
- a regulator control circuit having an output terminal, a feedback input, a control input, a control output, and positive and negative supply terminals, wherein the positive and negative supply terminals are coupled to positive and negative supply terminals of the battery, respectively, and wherein the control input is coupled to the output mode control terminal;
- a peak-current control circuit having an input terminal coupled to the output terminal of the regulator control circuit, and an output terminal coupled to the radio receiver and coupled to the feedback input of the regulator control circuit, and wherein the peak-current control circuit comprises a plurality of current control devices coupled to the control output,
  - wherein the processor enables a first combination of the plurality of current control devices for supplying the first limited current to the radio receiver, and
  - wherein the processor enables a second combination of the plurality of current control devices for supplying the second limited current to the radio receiver.

10. The selective call receiver as recited in claim 1, further comprising a high-current load circuit, wherein the processor is further caused the regulator to supply no more than the second limited current to the radio receiver for the second predetermined time when the high-current load circuit is active and the energy level of the battery is at or below the predetermined threshold.

11. The selective call receiver as recited in claim 10, wherein the high-current load circuit comprises a selected one of a vibrator motor, an alerting device, an audio circuit, and a display with backlighting.

12. A selective call receiver operating from a battery, comprising:
   a radio receiver;
   a regulator coupled to the battery and the radio receiver;
   a capacitor coupled to the regulator and the radio receiver;
   a high-current load circuit; and
   a processor coupled to the radio receiver, the regulator and the high-current load circuit, the processor:
      configures the regulator to supply a first limited current to the radio receiver and the capacitor for a first predetermined time when the radio receiver and the high-current load circuit are not active during overlapping intervals of time, and
      configures the regulator to supply a second limited current to the radio receiver and the capacitor for a second predetermined time when the radio receiver and the high-current load circuit are active during overlapping intervals of time, wherein the first and second limited currents, and the first and second predetermined times are not the same, and
      enables the regulator to charge the capacitor and to power the radio receiver.

13. The selective call receiver as recited in claim 12, wherein the processor further comprises an output mode control terminal, and wherein the regulator comprises:
   an operational amplifier having a positive input terminal, first and second negative input terminals, an output terminal, and positive and negative supply terminals, wherein the positive and negative supply terminals are coupled to positive and negative supply terminals of the battery, respectively;
   a voltage reference circuit having an output terminal coupled to the positive input terminal of the operational amplifier, and positive and negative supply terminals, wherein the positive and negative supply terminals are coupled to positive and negative supply terminals of the battery, respectively;
   a loop stability element coupled to the output terminal of the operational amplifier;
   a high-power current switch including:
      an input terminal coupled to the output terminal of the operational amplifier,
      positive and negative supply terminals coupled to positive and negative supply terminals of the battery, respectively,
      an output terminal coupled to the radio receiver, and
      a feedback terminal coupled to the first negative input terminal of the operational amplifier; and
   a peak-current control circuit including:
      an input terminal coupled to the output terminal of the operational amplifier,
      a mode control terminal coupled to the output mode control terminal of the processor, wherein the mode control terminal is used for enabling the peak-current control circuit,
      a feedback terminal coupled to the second negative input terminal of the operational amplifier, and
      positive and negative supply terminals coupled to positive and negative supply terminals of the battery, respectively.

14. The selective call receiver as recited in claim 13, wherein the high-power current switch comprises:
   a first P-MOS transistor having:
      a first predetermined current capacity,
      a gate terminal coupled to the input terminal of the high-power current switch,
      an input terminal coupled to the positive supply terminal of the high-power current switch, and
      an output terminal coupled to the output terminal of the high-power current switch;
   a first resistor having first and second terminals, wherein the first terminal is coupled to the output terminal of the first P-MOS transistor; and
   a second resistor having first and second terminals, wherein the first terminal of the second resistor is coupled to the second terminal of the first resistor and is further coupled to the feedback terminal of the high-power current switch, and the second terminal of the second resistor is coupled to a ground potential.

15. The selective call receiver as recited in claim 14, wherein the peak-current control circuit comprises:
   a switch having:
      an input and output terminal, wherein the input terminal is coupled to the input terminal of the peak-current control circuit, and
      a control terminal coupled to the mode control terminal of the peak-current control circuit;
   a second P-MOS transistor having:
      a second predetermined current capacity equal to a fraction of the first predetermined current capacity,
      a gate terminal coupled to the output terminal of the switch;
      an input terminal coupled to the positive supply terminal of the peak-current control circuit, and
      an output terminal coupled to the feedback terminal of the peak-current control circuit;
   a resistor having first and second terminals, the first terminal coupled to the output terminal of the second P-MOS transistor, and the second terminal coupled to a ground potential; and
   a third P-MOS transistor having:
      a gate terminal coupled to the mode control terminal of the peak-current control circuit,
      an input terminal coupled to the positive supply terminal of the peak-current control circuit, and
      an output terminal coupled to the gate terminal of the second P-MOS transistor.

16. The selective call receiver as recited in claim 12, wherein the processor further comprises an output mode control terminal, and wherein the regulator comprises:
   a regulator control circuit having an output terminal, a feedback input, a control input, a control output, and positive and negative supply terminals, wherein the positive and negative supply terminals are coupled to positive and negative supply terminals of the battery, respectively, and wherein the control input is coupled to the output mode control terminal;
   a peak-current control circuit having input terminal coupled to the output terminal of the regulator control circuit, and an output terminal coupled to the radio receiver and coupled to the feedback input of the regulator control circuit, and wherein the peak-current control circuit comprises a current control devices coupled to the control output, wherein the processor enables a first combination of the current control devices for supplying the first limited current to the radio receiver, and wherein the processor enables a second combination of the current control devices for supplying the second limited current to the radio receiver.

17. A regulator, comprising:

an operational amplifier having a positive input terminal, first and second negative input terminals, an output terminal, and positive and negative supply terminals;

a voltage reference circuit having an output terminal coupled to the positive input terminal of the operational amplifier, and positive and negative supply terminals;

a loop stability element coupled to the output terminal of the operational amplifier;

a high-power current switch including:
an input terminal coupled to the output terminal of the operational amplifier,
positive and negative supply terminals,
an output terminal coupled to an external load, and
a feedback terminal coupled to the first negative input terminal of the operational amplifier; and a peak-current control circuit including:
an input terminal coupled to the output terminal of the operational amplifier,
a mode control terminal for enabling the peak-current control circuit,
a feedback terminal coupled to the second negative input terminal of the operational amplifier, and
positive and negative supply terminals.

18. The regulator as recited in claim 17, wherein the high-power current switch comprises:

a first P-MOS transistor having:
a first predetermined current capacity,
a gate terminal coupled to the input terminal of the high-power current switch,
an input terminal coupled to the positive supply terminal of the high-power current switch, and
an output terminal coupled to the output terminal of the high-power current switch;

a first resistor having first and second terminals, wherein the first terminal is coupled to the output terminal of the first P-MOS transistor; and a second resistor having first and second terminals, wherein the first terminal of the second resistor is coupled to the second terminal of the first resistor and is further coupled to the feedback terminal of the high-power current switch, and the second terminal of the second resistor is coupled to a ground potential.

19. The regulator as recited in claim 18, wherein the peak-current control circuit comprises:

a switch having:
an input and output terminal, wherein the input terminal is coupled to the input terminal of the peak-current control circuit, and
a control terminal coupled to the mode control terminal of the peak-current control circuit;

a second P-MOS transistor having:
a second predetermined current capacity equal to a fraction of the first predetermined current capacity,
a gate terminal coupled to the output terminal of the switch,
an input terminal coupled to the positive supply terminal of the peak-current control circuit, and
an output terminal coupled to the feedback terminal of the peak-current control circuit;

a resistor having first and second terminals, the first terminal coupled to the output terminal of the second P-MOS transistor, and the second terminal coupled to a ground potential; and a third P-MOS transistor having:
a gate terminal coupled to the mode control terminal of the peak-current control circuit,
an input terminal coupled to the positive supply terminal of the peak-current control circuit, and
an output terminal coupled to the gate terminal of the second P-MOS transistor.

20. A selective call receiver comprising the regulator of claim 17.

* * * * *